2,980,718
METHOD OF DEGUMMING SOYBEAN OIL

George C. Cavanagh and Robert S. Bean, Fresno, Calif., assignors to Ranchers Cotton Oil, Fresno, Calif.

No Drawing. Filed Mar. 25, 1958, Ser. No. 723,635

4 Claims. (Cl. 260—428.5)

The present invention relates to the degumming of soybean oil and more particularly to a method of degumming soybean oil in miscella which avoids the deleterious effect of prior art methods on color, flavor, and stability of the degummed oil.

The removal of gums from soybean oil has been a serious problem lacking suitable solution prior to the subject invention. As with many glyceride oils, soybean oil contains mucins, phospholipides such as lecithin, waxes, and the like, all of which are subsequently referred to hereinafter as gums or gummy substances. Where lecithin or other phospholipides are to be recovered for use in food modifiers, cosmetics, soaps or one of their many other uses, their presence in the crude soybean oil is regarded as advantageous. However, when the soybean oil is to be used for edible oils and drying oils or paints, the presence of the gums is a disadvantage and it is, of course, desirable to separate them from the oil.

It is conventional to refine glyceride oils, such as soybean oil, with alkali refining agents, such as caustic soda, to neutralize the free fatty acids, and to remove impurities, gums, color bodies, and the like, from the oil. However, it has been discovered that the sodium ion has a detrimental effect on the flavor, color, and stability of the oil. Accordingly, any chemical material which releases the sodium ion when combined with soybean oil is to be avoided. This, of course, has been one of the serious drawbacks of the prior art refining methods since sodium hydroxide, for example, which is widely used as a refining agent, makes the sodium ion available when admixed with the oil.

We have discovered that the limited addition of alcohol and water to a miscella of soybean oil and a solvent in a manner described fully hereinafter, yields a degummed oil of improved flavor, color, and stability. Although it is recognized that alcohol has been used in the past in the refining of soybean oil, it is not known to have been used with water or in the amount or in association with the other steps of the present invention.

Accordingly, it is an object of the present invention to provide a method of degumming soybean oil in miscella.

Another object is to provide a method for degumming soybean oil without the use of alkaline agents and more particularly without the presence of sodium ions other than as they may be present in inconsequential amounts as impurities.

Another object is to avoid the release of the sodium ion in a process for degumming soybean oil.

Another object is to provide a process for degumming soybean oil in which alcohol is utilized in much smaller quantities than heretofore believed possible to achieve desired degumming.

Another object is to provide a process as set forth in the preceding paragraph including the step of adding a predetermined amount of water during the process of degumming the soybean oil.

Another object is to avoid exposing either the miscella or the soybean oil to air or light for more than a minimum before degumming.

Other objects will become more fully apparent upon reference to the following description.

Before specifically describing the subject process, the steps thereof are briefly outlined, as follows:

(1) A miscella of predetermined portions of soybean oil and a suitable solvent is prepared or obtained as the result of an extraction process.

(2) The miscella is heated to a temperature within predetermined limits.

(3) Water and alcohol are added in predetermined amounts to the miscella.

(4) The miscella, water and alcohol are mixed in a prescribed manner and for a predetermined time to yield a curdy break.

(5) A predetermined additional amount of water is added to the mixture of miscella, water and alcohol.

(6) The mixing step in number 4, above, is repeated until a break-free degummed oil results.

(7) The moisture, gums, alcohol and solvent are separated from the break-free degummed oil.

Referring in detail to the steps of the process of this invention, initially, a miscella of soybean oil in a solvent is prepared. Hexane is the preferred solvent although any suitable solvent may be employed. Preferably, the miscella contains from at least about sixty-five percent to about seventy-five percent by weight of soybean oil. It has been found that the subject is not effective with any less than about sixty-five percent of oil in the miscella. On the other hand, the miscella may contain higher percentages of oil. Of course, as one-hundred percent oil is approached, the advantages of miscella degumming decrease.

The miscella is then heated in any suitable manner to at least about one-hundred and thirty degrees Fahrenheit but not to exceed about one-hundred and forthy-five degrees Fahrenheit. At that temperature it is vigorously mixed as by recycling through an homogenizer. These temperatures are to be contrasted with the temperature of one-hundred and eighty degrees Fahrenheit conventionally used in refining soybean oil. The temperatures employed in the present process are regarded as being of considerable importance. Although the reasons are not fully understood, the lower limit is extremely critical. Of course, the upper limit of one-hundred and forty-five degrees is critical if hexane is employed inasmuch as hexane has a boiling point of around one-hundred and forty-five degrees Fahrenheit. In essence, therefore, the upper temperature limit is controlled by the vaporization temperature of the solvent used. Of course, these are practical limits inasmuch as the process is carried out at normal pressures. Obviously, if the process were to be carried out under increased pressures, the temperatures could be increased. However, it has been found that by keeping the operating temperatures lower, the gums are lighter. Thus a superior product is attainable and less energy required if the temperatures are kept as low as possible. While this has previously been recognized, prior to the present invention much higher temperatures were required.

Next, water and alcohol are added to the miscella. Water is added to the miscella in an amount equal to about one-half percent to about two and one-half percent by weight of the oil in the miscella. Preferably, the amount of water added at this point is approximately two percent. Alcohol is added in an amount equal to about one and one-half percent to about two and one-half percent by weight of the oil in the miscella. Likewise, the preferred amount of alcohol is two percent. Any suitable alcohol may be used such as, but not limited to, ethyl, methyl, or isopropyl alcohol. It is to be emphasized, however, that the addition of water and alcohol may be effected simultaneously or in either order, that is, the addition of water may precede the addition of alcohol, or vice versa.

The miscella, water, and alcohol are then vigorously mixed for a period of time sufficient to yield a curdy break. The described temperature is maintained throughout the mixing step. The mixing step may be effected in either one of two ways, as follows. The miscella, water and alcohol may be mixed vigorously in a mixing machine providing a high shear, for a period of approximately five to ten minutes. Alternatively, the miscella, water and alcohol can be recycled through a homogenizer for a period of about thirty to ninety seconds. With either manner of mixing, for the prescribed periods, a curdy break is developed.

Thereafter, water is again added to the mixture of miscella, water and alcohol, as mixed and while still in said heated condition within the stated temperature ranges. This time water is added in an amount equal to about one percent to about two percent by weight of the oil in the miscella. The amount of water added depends on the oil quality. The successive water adding steps are essential inasmuch as it has been discovered that the superior results of the subject degumming process will not occur without such repetition.

Thereafter, and once again, the mixture of miscella, water, and alcohol is vigorously mixed in either of the manners described above in connection with the first mixing step. Also, the periods of time are the same as stated previously. In either case, and upon mixing for said periods of time, a break-free degummed oil develops. Throughout the steps thus far performed the temperature range described is maintained.

The final step of the process is to remove or separate the degummed oil from the water, gums, solvent, and alcohol. This can be accomplished in one of two ways. First, the temperature of the mixture is elevated to a degree sufficient to vaporize the alcohol and the water in the mixture as one phase. Thereafter, the temperature is raised higher to vaporize the hexane, or other solvent, as a second phase and thereby leaving the degummed oil. The second manner of separation involves raising the temperature by an amount over about one-hundred and forty-five degrees Fahrenheit, this being the approximate boiling point of hexane, so that the water, alcohol, and hexane are driven off together. At this point it should be understood that water is miscible in hexane and alcohol, and alcohol is miscible with water and hexane. However, it is known that a mixture of water and alcohol is immiscible with hexane. Therefore, if the water, alcohol and hexane are driven off together, they can be separated by decanting the mixture of moisture and alcohol from the hexane. As with the first manner of separation, the second procedure isolates the degummed oil. The undesirable gums are, of course, dissolved in the solvent and carried off therewith.

It has been found that a break-free degummed oil results only when following the steps of the subject invention as above described. The degummed oil has improved characteristics of color, flavor, and stability. This is believed primarily due to the avoidance of alkaline agents in the processing of the soybean oil so as to avoid release of the sodium ion in the oil. It is important in processing the present invention that neither the miscella nor the oil be exposed for more than about six hours to light or air following extraction from the bean and before initiating the degumming process. If further exposure occurs, deleterious color changes result.

In addition to the advantages described above in connection with the production of an improved degummed oil, it is to be noted that the degumming process has been effected with oil in miscella rather than oil alone. The advantages of miscella degumming include the ease with which the ingredients are separated, and the lower viscosity of fluids utilized. Because of the first two advantages, it is possible to operate the degumming apparatus at greater capacity. Further, as has been explained briefly above, inasmuch as the degumming can be carried out at low temperatures, the gums are much lighter.

While the instant invention is described in terms of particular ingredients and ranges thereof and in what is conceived to be the preferred embodiments, it is recognized that departures may be made therefrom within the scope of the invention which is to be accorded the full scope of the claims so as to embrace any and all equivalent ingredients, ranges, and steps.

Having described my invention, what I claim as new and desire to secure by Letters Patent is:

1. In a method of treating a miscella of soybean oil and a solvent to remove gum and the like substances from the oil so as to obtain a substantially degummed oil, said miscella including at least about sixty-five percent by weight of soybean oil and a suitable solvent therefor, the steps of heating the miscella to a temperature of at least about one hundred and thirty degrees Fahrenheit; adding from one and one-half to two and one-half percent by weight of the oil each of water and alcohol to the miscella, the alcohol being selected from the group consisting of ethyl, methyl and isopropyl alcohol; vigorously mixing the miscella, water and alcohol to develop a curdy break; adding water from approximately one to two percent by weight of the oil to the miscella, water and alcohol mixture subsequent to said mixing; again mixing the miscella, water and alcohol mixture to form a break-free degummed oil; and separating the water, alcohol, gums and solvent from the degummed oil, all of said steps being performed in the absence of alkali metal hydroxides and their metallic ions, and exposure of the oil and the miscella to air and light prior to degumming being limited so as not to exceed six hours for either.

2. In a miscella of soybean oil and a solvent, a method of removing gums from the soybean oil while in such miscella and in the absence of alkali metal hydroxides and their metallic ions comprising heating the miscella to a temperature of at least about one-hundred and thirty degrees Fahrenheit; adding water to the miscella in an amount equal to at least about from one and one-half percent to two and one-half percent by weight of the oil in the miscella; adding alcohol to the miscella in an amount equal to at least about from one and one-half percent to two and one-half percent by weight of the oil in the miscella, said alcohol being selected from the group consisting of ethyl, methyl and isopropyl alcohol; mixing the miscella, alcohol and water vigorously until a curdy break develops; adding water to the mixed miscella, alcohol and water mixture in an amount equal to at least about two percent by weight of the oil in the miscella; again vigorously mixing the miscella, alcohol and water until a break-free degummed oil results; and separating the water, alcohol, gums and solvent from the degummed oil, exposure of the oil and miscella to air or light prior to degumming being limited so as not to exceed six hours.

3. A method of degumming crude soybean oil in the absence of alkali metal hydroxides and their metallic ions and in a miscella of the soybean oil and a solvent including at least about sixty-five percent by weight of soybean oil in a suitable solvent therefor comprising limiting exposure of the oil and miscella to air and light so as not to exceed six hours, heating the miscella to a temperature of at least about one hundred and thirty degrees Fahrenheit but not exceeding the temperature of vaporization of the solvent; adding water and alcohol to the miscella wherein the quantity of each added is equal to about one and one-half to about two and one-half percent by weight of the oil in the miscella, the alcohol being selected from the group consisting of ethyl, methyl and isopropyl alcohol; vigorously mixing the miscella, water and alcohol for a period of time sufficient to form a curdy break in the mixture; adding water to the mixture following the mixing step wherein the water added is equal to about one percent to about two percent by weight of the oil in the miscella; vigorously mixing the miscella, alcohol and water for a period sufficient to yield a break-free degummed oil; and isolating the degummed oil by removing the water, solvent, gums and alcohol from the oil.

4. The method of claim 3 wherein the solvent is hexane and the upper temperature limit is approximately one-hundred and forty-five degrees Fahrenheit.

References Cited in the file of this patent
UNITED STATES PATENTS 2,561,330    Ayers _____ July 24, 1951
2,789,120    Cavanagh _____ Apr. 16, 1957

OTHER REFERENCES

Bailey: "Industrial Oil and Fat Products," 2nd ed. (1951), page 601.